United States Patent [19]

Fidler et al.

[11] Patent Number: 5,686,996

[45] Date of Patent: Nov. 11, 1997

[54] DEVICE AND METHOD FOR ALIGNING A LASER

[75] Inventors: James K. Fidler; Richard J. Markle, both of Austin, Tex.

[73] Assignee: Advanced Micro Devices, Inc., Sunnyvale, Calif.

[21] Appl. No.: 450,693

[22] Filed: May 25, 1995

[51] Int. Cl.⁶ ............................ G01B 11/00; G01J 1/40; G01N 21/01
[52] U.S. Cl. ..................... 356/399; 356/234; 356/244
[58] Field of Search ..................... 356/399–401, 356/373, 375, 358, 345; 430/5; 250/548, 557; 355/71, 53, 67

[56] References Cited

U.S. PATENT DOCUMENTS

| | | | |
|---|---|---|---|
| 3,614,238 | 10/1971 | Stites | 356/124 |
| 3,734,627 | 5/1973 | Edwards | 356/153 |
| 3,765,766 | 10/1973 | McConnell | 356/400 |
| 3,801,205 | 4/1974 | Eggenschwyler | 356/138 |
| 3,813,171 | 5/1974 | Teach | 356/152 |
| 3,819,273 | 6/1974 | Unema | 356/152 |
| 3,826,576 | 7/1974 | Stewart | 356/164 |
| 4,142,798 | 3/1979 | Barbee, Jr. | 356/138 |
| 4,223,227 | 9/1980 | Horwitz | 250/491 |
| 4,516,253 | 5/1985 | Novak | 378/34 |
| 4,632,557 | 12/1986 | Thompson | 356/401 |
| 4,739,177 | 4/1988 | Borden | 250/574 |
| 4,804,853 | 2/1989 | Borden et al. | 250/574 |
| 4,825,094 | 4/1989 | Borden et al. | 250/573 |
| 4,832,251 | 5/1989 | Hawrylo | 228/105 |
| 4,853,745 | 8/1989 | Kamiya et al. | 355/43 |
| 5,042,709 | 8/1991 | Cina et al. | 228/105 |
| 5,047,648 | 9/1991 | Fishkin | 250/492.2 |
| 5,077,905 | 1/1992 | Murray, Jr. | 33/412 |
| 5,132,548 | 7/1992 | Borden et al. | 250/574 |
| 5,157,678 | 10/1992 | Borden | 372/34 |
| 5,200,798 | 4/1993 | Katagiri et al. | 356/363 |
| 5,206,706 | 4/1993 | Quinn | 356/400 |
| 5,347,138 | 9/1994 | Aqui et al. | 250/573 |
| 5,360,980 | 11/1994 | Borden et al. | 250/573 |
| 5,467,166 | 11/1995 | Shiraishi | 355/71 |
| 5,477,057 | 12/1995 | Angeley et al. | 250/548 |
| 5,489,986 | 2/1996 | Magome et al. | 356/401 |
| 5,491,555 | 2/1996 | Romine | 356/399 |
| 5,550,633 | 8/1996 | Kamiya | 356/358 |
| 5,552,891 | 9/1996 | Balzer | 356/400 |

OTHER PUBLICATIONS

"Monitoring Vaccuum Process Equipment: In Situ Monitors–Design and Specification", *Microcontamination*, Jan. 1991, Canon Communications, Inc.

"Model 70 sensor for hot and corrosive environments", *High Yield Technology*, Pacific Scientific, Rev. 7/93.

"Installing In Situ Sensors In Single–Wafer Plasma Etchers", *Microcontamination*, Feb. 1991, Canon Communications, Inc.

*Primary Examiner*—Frank G. Font
*Assistant Examiner*—Michael P. Stafira
*Attorney, Agent, or Firm*—Kevin L. Daffer; Conley, Rose & Tayon

[57] ABSTRACT

A device is provided for aligning a laser. For example, such a device could be used to align a laser as part of a particle measurement device in a semiconductor process tool. The device consists of a rigid member with alignment marks which define the intended point of impingement of a beam emitted from the laser. The laser is moved to allow the emitted laser beam to extend upon the alignment device and impinge upon the alignment marks. When the laser beam impinges upon alignment marks, preferably formed near the center of the alignment device, the laser is determined to be in proper alignment. The device is configured having a outer circumference equal to the terminating element which the device replaces during the alignment procedure. The device is then removed from the semiconductor process tool and the terminating element, either a beam stop or a photodiode detector, is re-inserted. A procedure utilizing relatively few steps for properly aligning the laser is thereby provided.

23 Claims, 3 Drawing Sheets ized within the path of the laser source directly within laser beam path suffices both as a beam stop and particle detector. Similar to the beam stop, the detector is designed to receive the full extent of the laser beam, however, the detector is designed to fully receive the beam. As defined hereinbelow, the cessation point of the laser beam thereby comprises a beam stop and/or a photodiode detector.

DEVICE AND METHOD FOR ALIGNING A LASER

BACKGROUND OF THE INVENTION

1. Field of the Invention

This invention generally relates to laser alignment and more particularly to a device and method for aligning a laser, wherein the laser can be embodied in a semiconductor fabrication environment.

2. Description of the Relevant Art

There have been many articles written about the use of light as a technique for monitoring particle contamination within a semiconductor process tool. See, e.g., Borden, "Monitoring Vacuum Process Equipment: In Situ Monitors Design and Specification" *Microcontamination*, January 1991; and, Borden, "Installing In Situ Sensors in Single-Wafer Plasma Etchers" *Microcontamination*, February, 1991 (herein incorporated by reference). Generally speaking, monitoring of particle contamination employs a beam of light placed within a particle-containing chamber. The particles are typically entrained within a gas flow, and the gas flow is directed through the light beam. As it strikes the particles, the light beam (i) reflects off the surface of the particles, (ii) is absorbed (or blocked) by the particles, and/or (iii) undergoes a change in its optical properties when subjected to the particles. The temporary interaction between the light beam and the particle (whether it is a reflection, absorption or optical change) is then read by a detector disposed nearby. For particles that are much smaller than the wavelength of the light beam, the interaction between the light beam and the particle is proportional to the size of the particle and inversely proportional to the wavelength of the light. By measuring the intensity of light that is translated due to its interaction with the entrained particles, an intensity reading can be taken determinative of the quantity and/or size of particles within the laser-illuminated gas flow area. As defined hereinbelow, "interaction" between the particle and impinging light refers to scattering, blocking, absorption, or any other alteration of the beam from its original condition resulting from its impingement upon the gas-entrained particles.

A typical particle measuring apparatus generally utilizes a laser beam. The laser beam is designed to extend from a laser source to a beam stop. The laser source provides a specific wavelength of light. The beam stop is designed to absorb that light as it strikes the beam stop material. A photodiode detector of common design is configured to receive light scattered from particles traveling through the laser beam. The photodiode described herein is generally a semiconductor device designed to convert light that impinges upon its surface into an electrical signal. The resulting electrical signal is proportional to the impinging light, and thereby serves as a measurement of that light. A correlation is made between the size and number of particles traveling through the laser beam and the amount of scattering directed upon the photodiode and converted to electrical signal intensity.

According to an alternative arrangement, the laser beam can be designed to extend from a laser source to a photodiode detector. Thus, instead of configuring the detector to receive scattered light as in the above arrangement, this alternative arrangement presents a detector within the path of the laser beam extending from the laser itself and not within the path of the scattered laser beam. In this arrangement, blockage of light by particles (instead of scattering of light) is measured by the detector. The detector For optimal functionality, the beam stop surface according to the scattering arrangement (i.e., the former arrangement described above), must completely absorb the laser beam focused thereon. If the beam stop is unable to absorb the beam, the beam will reflect back into the measurement area. Reflection of light from the beam stop must be avoided. Light reflected from the beam stop could deleteriously skew the photodiode readings. For example, reflected light from the beam stop can extend back on the particles possibly causing a double reflection upon the photodiode—i.e., light from the laser source reflected off particles and light reflected from the beam stop. While inadequate absorption of the beam stop is a problem, another problem, however, is misalignment of the beam stop. If a blockage arrangement is chosen, whereby the beam stop is substituted for a photodiode detector, then the detector must be aligned to the laser source. The detector must be carefully aligned to receive all of the light not absorbed, reflected or blocked by the particles. A detector that is not properly aligned to the laser source may fail to detect differences in light cause by the presence or absence of particles sent between the laser source and detector.

If a beam stop is used instead of a photodetector, it is important that the beam stop be carefully aligned to receive all light energy which is not reflected from the surface of an intermediate-placed particle. Accordingly the beam stop must be aligned within the laser beam path. If the beam stop is misaligned, instead of striking the beam stop and being absorbed the laser beam will strike the surrounding beam stop support and be deleteriously reflected back into the measurement area. The beam stop support which surrounds the beam stop is typically a non-absorbing surface which is dimensioned to fixedly receive a beam stop. A beam stop which is coupled onto the support and which is misaligned with the laser beam will cause an inaccurate reading upon the detector as a result of reflection not necessarily from particles but, instead, from the reflective support onto which the beam is misaligned.

In an effort to overcome the above misalignment problems, many researchers have set forth a particle measuring device having a defined beam path extending between a laser beam and a beam stop (or photodiode detector) fixed in relation to the laser beam. If a beam stop arrangement is used, the measuring device further includes one or more photodiodes arranged proximate to the beam path. The beam stop or detector is hereinafter defined as a beam terminating element. Terminating element does not imply that the beam terminates in all instances, only that it lies at the end of the beam path emanating directly from the laser. The beam path is therefore "self-contained" within the measuring device, wherein the measuring device includes a housing which fixes the laser position and terminating element near opposite ends of the housing. Configured through a portion of the housing near the center of the housing is an aperture. The aperture allows passage of gas-entrained particles through the measuring device between the laser and the terminating element. A principle advantage of the self-contained device is that the termination point is configured at a known position relative to the laser beam extending from the laser. The terminating element is therefore assured of alignment with the laser.

Shown in FIG. 1 is an elevational view of a self-contained particle measuring device 10 attached within an exhaust tube 12 of a semiconductor process tool 14. As defined herein, a "semiconductor process tool" or "process tool" refers to any semiconductor processing device used for depositing or removing conductive, non-conductive, or related semiconductive films. The process tool includes, for example, any device having a chamber and gaseous material used within said chamber. Exemplary such chambers include a plasma etch chamber, a chemical vapor deposition (CVD) chamber, etc. A "particle measuring device" is any device which measures particles or particles evacuated from the process tool chamber or loadlock chambers surrounding the process tool chamber.

FIG. 1 illustrates exhaust tube or process chamber 12 of substantially circular cross-section. One end 16 of chamber 12 is sealingly connected into the process tool. During operation, chamber 12 is provided with a vacuum source (not shown) which is placed distal from end 16 to evacuate, at the conclusion of process operation, material from process tool 14. Arrows 19 illustrate the evacuation direction created by the vacuum source from tool 14 through chamber 12. Entrained within the flow stream of the vacuum are particles. The particles are generally entrained with the flow of gas or gases being evacuated, however, other forces such as gravitational, thermopheritic, electropheritic, etc., can also provide motive transport of the particles through the light beam. Whatever, the motive force chosen, particles are designed to move past measuring device 10, shown in further detail in reference to FIG. 2.

Turning now to FIG. 2, a cross-sectional view along plane 2 of FIG. 1 is shown in partial breakaway. FIG. 2 provides more detail as to the various components of self-contained particle measuring device 10. Device 10 is shown having an outer housing 18. Secured within housing 18 near the opposing ends of housing 18 is a laser 20 and a terminating element 21. Laser 20 emits a laser beam 22. Fixed within housing 18, in alignment with laser beam 22, is beam stop 21. Terminating element 21, if configured as a beam stop, includes an anti-reflective material coated upon the inwardly facing surface of the beam stop. The anti-reflective material absorbs the laser beam and reflects any remaining radiation energy into a beam stop cavity, so as to prevent back scattering of laser light into the sensing area. Disposed about the sensing area is one or more photodiodes 24. Photodiodes 24 can be arranged in pairs located 180 degrees apart on opposing sides of the longitudinal axis of beam 22, or as arcuate members having concave-shaped inner surface which surrounds beam 22 longitudinal axis.

Formed completely through housing 18 between laser 20 and terminating element 21 is an aperture 26. Aperture 26 is designed to permit passage of gas-entrained particles through housing 18 and consequently, while device 10 is in operation, through the laser beam path 22. As particles pass through the aperture, they scatter, absorb, block, or otherwise change the optical properties of the original laser light. If the particles are scattered, the light energy reflects from its original path to reflected paths wherein at least a portion of the reflected light is measured by proximately arranged photodiodes 24. If particles do not pass through aperture 26, then the beam energy will remain along its original course and be completely absorbed by a beam stop-configured terminating element 21. In the latter instance, photodiodes 24 detect no radiation energy and consequently no particles are detected. Reflected light is detected by photodiodes 24 and then converted to an electrical signal. The electrical signal is then amplified and measured to determine the number and size of particles passing through aperture 26.

FIG. 3 is a cross sectional view along plane 3 of FIG. 2. Photodiodes 24 are shown arranged as a pair of photodiodes according to one embodiment. The pair of photodiodes 24 are configured opposite one another a spaced distance about laser beam path 22. Photodiodes 24 are fixed in place upon the inner surface 28 of housing 18. Details regarding the configuration of a conventional self-contained particle measuring device, such as that shown in FIGS. 1–3, is provided in reference to U.S. Pat. No. 4,804,853 (herein incorporated by reference).

While self-contained measuring device 10 provides accurate particle measurement, it has many inherent drawbacks. Aperture 26 must naturally allow ingress of the gaseous material associated with the process chamber exhaust. In many instances, the gaseous material expelled from a semiconductor process chamber is highly corrosive or caustic. For example, the gas exhaust from a plasma etcher contains corrosive halogen species and polymer carbon species. Corrosive gas can partially remove or etch away the inner walls of housing 18 as well as the exposed optics of the laser. Additionally, film deposits of, for example, carbon polymers can form upon beam stop 21 and photodiodes 24 inner surface which, after time, will render said surfaces useless as anti-reflecting and sensing surfaces, respectively.

Due to the costly nature of measuring device, and the need to minimize opening of the process tool 10 and chamber 12 to frequent cleaning, it is therefore imperative that device 10 be redesigned dissimilar from the self-contained configuration shown in FIGS. 1–3. It would be desirable to design a non self-contained device (i.e., a device which is non-intrusive to the measuring gas and particles). The non-intrusive device must therefore be designed having the laser optics, beam stop and photodiodes protected from exposure to the measuring gas and gas-entrained particles. Advantageously, the laser and beam stop would be mounted separate from each other. Instead of being mounted on a mutual housing disposed within the gas flow, the laser and terminating element are mounted separate from each other and sealed from the particle-contained gas source. Since the laser and terminating element are no longer provided in a self-contained housing in alignment with each other, the laser and terminating element of a non-intrusive device must be mounted separate from each other and in alignment with each other. Absent alignment, the beam reflection or beam absorption will be deleteriously skewed and reading taken at the photodiodes will be inaccurate.

SUMMARY OF THE INVENTION

The problems outlined above are in large part solved by using a non-intrusive particle measurement device used in conjunction with a laser alignment device in accordance with the present invention. According to one embodiment of a non-intrusive particle measurement device, the laser and terminating element are coupled to separate housings fastened over respective apertures on the exhaust tube of a semiconductor process tool. The laser is movably coupled to its housing, the terminating element is removable from its housing and, if used in conjunction with a beam stop, photodiodes are fixedly coupled to their housing. The apertures are sealed with a translucent material arranged between each housing and the chamber. The translucent material allows optical communication therebetween while preventing passage of gas or solid particles. Thus, the translucent material prevents the ingress into the laser-containing housing, terminating element-housing (terminal housing) and photodiode-containing housing of any gases, particles, or other materials that might be present in the exhaust tube of the semiconductor process tool.

The components of the non-intrusive particle measurement device (i.e. the laser and the terminating element) are no longer coupled to a common housing, as in the self-contained particle measurement device. Therefore, it is necessary to periodically align the different components (i.e. the laser beam with the terminating element). The components may accidentally shift from their stated positions, or be moved either purposefully or accidentally, thereby creating the need for realignment. Particularly, the laser can be said to be "properly aligned" in one embodiment when it impinges on the center of the face of the terminating element. When impinging in this way, substantially no light is reflected from a beam stop-configured terminating element back into the measurement area.

The device of the present invention can be used to provide the aforementioned alignment. That is, the laser alignment device, when placed into the housing of the terminating element in accordance with this invention, provides information pertaining to the current alignment of the laser when the laser is powered on. In one embodiment, the laser alignment device, during use, provides a visual response at the point of impingement of the laser beam upon the device. If no response is observed, then the laser is misaligned such that its light does not impinge the laser alignment device (nor the terminating element if the laser alignment device were removed and thereafter replaced with the terminating element).

The laser alignment device contains an alignment mark which defines the point of impingement at which the laser is "properly aligned", as defined above. In one embodiment, the alignment mark includes orthogonal lines, the intersection of which is at the center of the laser alignment device. By adjusting the laser and observing the resulting impingement positional change upon the laser alignment device the operator of the semiconductor process tool can align the laser such that the point of impingement of the laser light is the intersection of the two orthogonal lines. The alignment device is configured such that it is positioned where the beam stop would normally reside. After alignment is completed using the laser alignment device, the laser alignment device is removed and the terminating element is substituted therein.

The alignment process, when performed in accordance with this invention, takes relatively little time and effort. That is, relatively few steps are required in the alignment process. First, the beam stop and its stainless steel backing is removed. Second, the laser alignment device is coupled into the space vacated by the terminating element. Third, power is applied to the laser. Fourth, the laser is adjusted (via an adjustment coupling provided between the laser and its housing) until the point of impingement of the laser light on the laser alignment device is visually detected upon the alignment mark. Fifth, power is removed from the laser. Sixth, the laser alignment device is removed. Seventh, the terminating element and its stainless steel backing are coupled in place. Thereafter the semiconductor process tool may be returned to normal use.

Broadly speaking, the present invention contemplates a laser alignment device comprising an alignment mark which, during use, is responsive to an impinging laser beam at the point of impingement. The alignment mark comprises, for example, a pair of intersecting orthogonal lines, concentric circles similar to a "bulls eye" pattern, symbols, etc. The alignment mark is used to define the "proper alignment" of the laser. Response of the device to the laser may occur in many forms. Exemplary forms include visual and/or audible responses.

The invention also contemplates a mechanism for aligning a laser that is movably secured to a semiconductor process tool. The mechanism comprises a semiconductor process tool having first and second apertures extending into said tool. The apertures are sealingly covered by a translucent member. The mechanism further comprises a laser movably coupled onto the outside of the tool in alignment over the translucent member-covered first aperture. The mechanism further comprises a laser alignment device of the present invention coupled onto the outside of the tool in alignment over the translucent member covered second aperture. Finally, the mechanism comprises a power source coupled to the laser for generating, during use, a laser beam extending completely through the tool from the laser to the laser alignment device.

The invention further contemplates a method for aligning a laser coupled within a particle detector of a semiconductor process tool. A semiconductor process tool is provided having a translucent member sealingly coupled over each of a pair of spaced apertures formed through the tool housing. A laser is thereafter placed over one of the pair of member-covered apertures, and a terminal housing is connected over the other member-covered aperture. The method further comprises connecting a laser alignment device in accordance with this invention within the terminal housing. The laser may then be moved to align a laser beam extending from the laser such that said laser beam impinges upon the laser alignment device at the alignment mark position arranged thereon. The laser alignment device can then be replaced with a terminating element having an outer circumference equivalent to the laser alignment device.

The invention has been described herein as a mechanism for aligning a laser within a particle measurement device of a semiconductor process environment. It is understood, however, that the laser alignment device can be used in various other applications. Thus, the laser alignment device is not limited solely to semiconductor manufacturing. In fact, the laser alignment device could be used in particle measurement devices on other tools or devices and, more importantly, could be used in any application requiring laser alignment.

BRIEF DESCRIPTION OF THE DRAWINGS

Other objects and advantages of the invention will become apparent upon reading the following detailed description and upon reference to the accompanying drawings in which.

Figure 1:
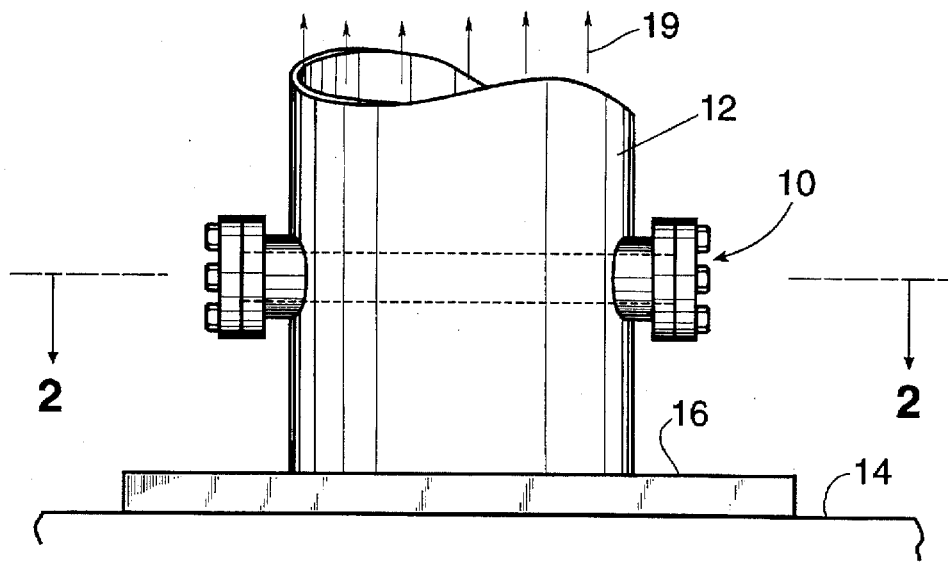
FIG. 1 depicts an elevational view of a semiconductor process chamber having a self-contained particle measurement device of prior design attached thereto.
Figure 2:
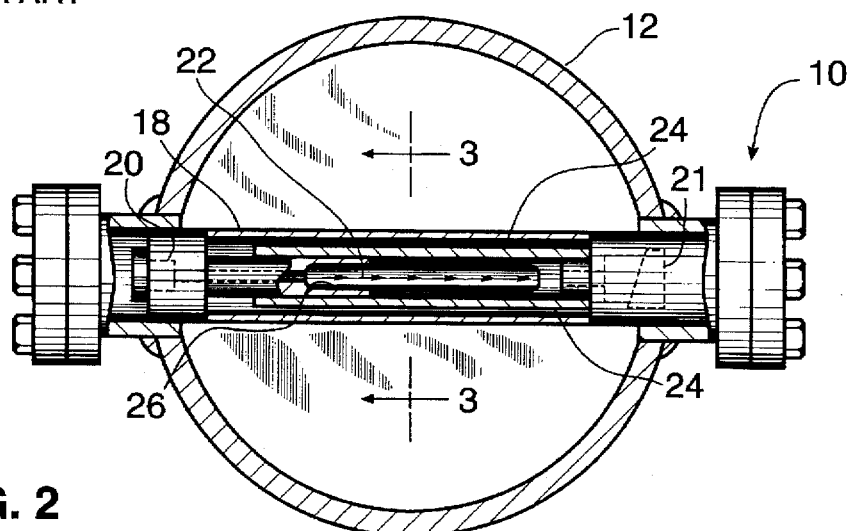
FIG. 2 is a partially broken away cross sectional view along plane 2 of FIG. 1.
Figure 3:
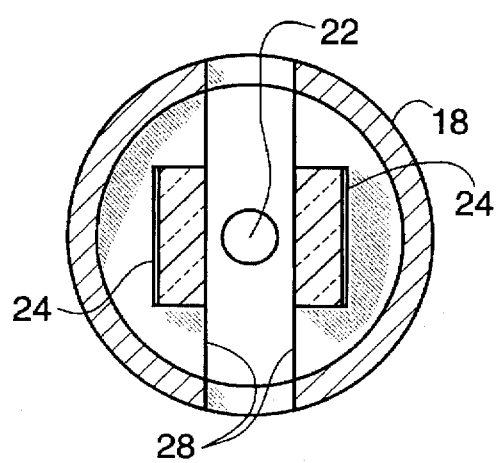
FIG. 3 is cross section along plane 3 of FIG. 2.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
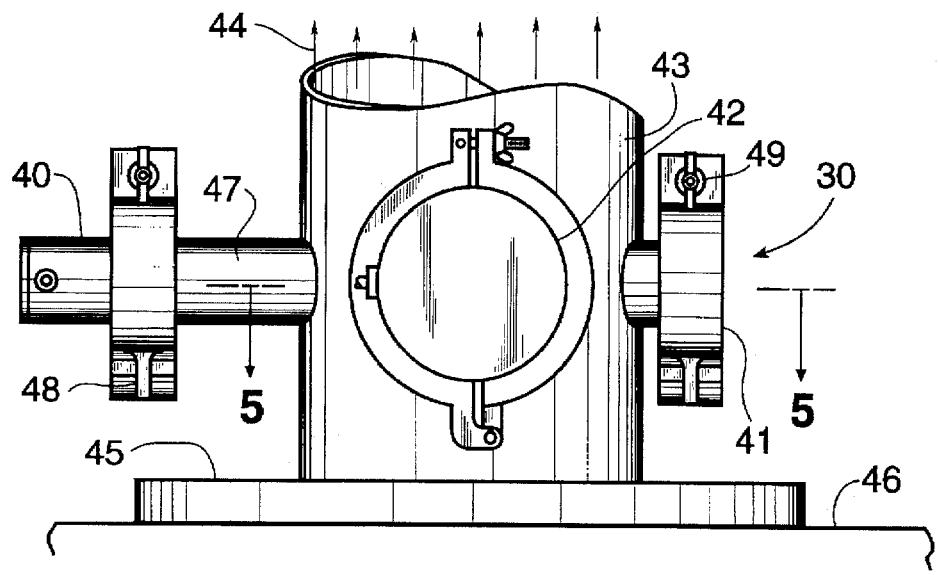
FIG. 4 depicts an elevational view of an exhaust tube of a semiconductor process tool with a non-intrusive particle measurement device of the present design attached thereto.

Turning now to FIG. 4, an elevational view of a non-intrusive particle measurement device 30 is shown. Included with device 30 is a laser 40, a terminating element removably coupled to a housing 41 (herein referred to as a terminal housing) and, if the terminating element is a beam stop, photodiodes coupled to a photodiode housing 42. Laser 40 is coupled to a tube 47 via a coupling 48. Coupling 48 is configured to allow movement of laser 40. Movement of laser 40 allows alignment of laser 40 to the terminating element coupled with terminal housing 41. Tube 47 is coupled over an aperture formed through the wall of Chamber 43. Tube 47 and housings 41 and 42 are coupled over apertures (not shown in FIG. 4) formed into chamber 43. Gas-entrained particles flow along path 44 within chamber 43. One end 45 of chamber 43 is coupled to a semiconductor process tool 46. Distal to end 45, a vacuum (not shown) may be attached to draw the gas and the gas-entrained particles in the direction of path 44. The housings and exhaust port may be constructed from stainless steel, for example. Laser 40 produces monochromatic light.

Figure 5:
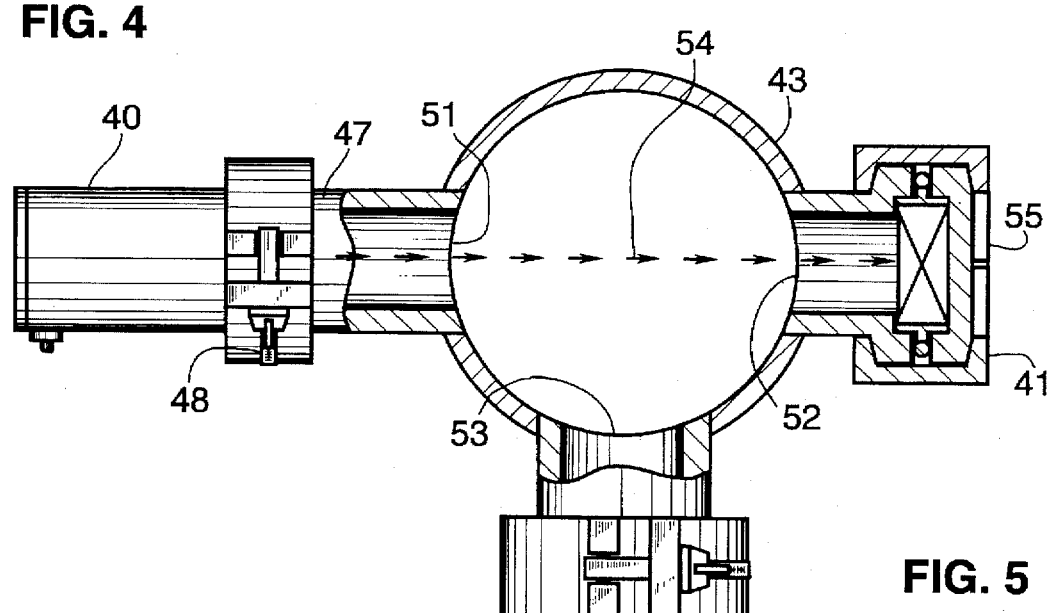
FIG. 5 is a partially broken away cross sectional view along plane 5 of FIG. 4.

In FIG. 5 a partially broken away view of a cross section along plane 5 of FIG. 4 is shown. Apertures formed through the wall of exhaust tube 43 are sealed with a translucent material 51, 52, and 53 such that the particles being measured do not contact laser 40, a terminating element 55 and the photodiodes coupled to photodiode housing 42. It is important to note that if terminating element 55 is a beam stop, then photodiode and associated housing 42 are needed to detect light scattered from the particles. However, if terminating element is a photodiode detector, then photodiode and associated housing 42 are not needed since scattered light is not to be detected. Instead, in the latter case, light absorption or blockage is being detected by terminating element 55. FIG. 5 also shows that chamber 43 can be of substantially circular cross section. Translucent material 51, 52, and 53 may be sapphire glass, for example. Laser light 54 emanates from laser 40, extends through translucent material 51, across exhaust port 43, through translucent material 52 and into terminating element 55. Terminating element 55, if configured as a beam stop, is coated with an anti-reflective coating that absorbs substantially all of the impinging laser light 54. As particles move through exhaust tube 43, many are directed through the laser beam path. If so designed, laser light is scattered from the particles entering the path of the laser beam. Some of the reflected laser light travels through translucent material 53 into the photodiode housing 42. The photodiodes coupled to the photodiode housing 42 sense the laser light and produce an electrical signal, which serves as a measurement of the scattered light.

Figure 6:
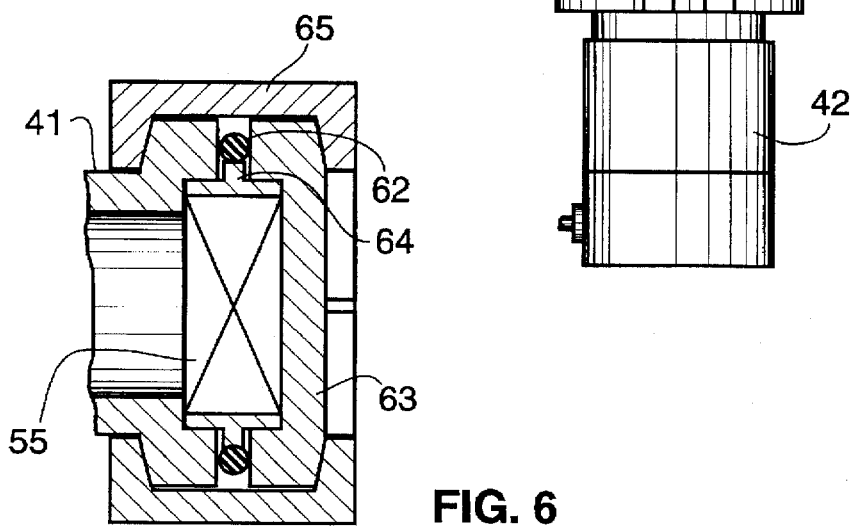
FIG. 6 depicts a terminal housing portion of the non-intrusive particle measurement device shown in FIGS. 4 and 5.

Turning now to FIG. 6, terminating element 55 and its terminal housing 41 are shown in more detail. Terminal housing 41 is a rigid metallic structure, with beam stop 55 and a solid backing 63 coupled to housing 41 by a conflat metal gasket or non-metal o-ring 62. O-ring 62 applies compressive pressure directed radially inward upon a centering ring 64, thereby holding beam stop 55 securely. O-ring 62, centering ring 64, and backing 63 are compressively clamped together by clamp 65. Clamp 65 comprises two members having semicircular inner surfaces. The two members are hinged on one end and secured with a thumb screw 49 (shown in FIG. 4) on the opposite end. Thumb screw 49 is tightened to apply the compressive pressure of clamp 65 to terminal housing 41.

Laser 40 is movably coupled to tube 47, and beam stop 55 is configured in a separate housing 41. Tube 47 and terminal housing 41 are independently coupled to chamber 43 over separate apertures. Laser 40 must be aligned to terminating element 55 so that the laser light emanating from laser 40 will be completely absorbed by a beam stop-embodied terminating element 55 or completely detected by a detector-embodied terminating element. If laser 40 is not aligned, the laser light will reflect off the other materials in the device, such as housing 41 or even the wall of the exhaust port 43 (shown in FIGS. 4 and 5). The housing 41, clamp 65, o-ring centering ring 64, and the solid backing 63 may be constructed from stainless steel, for example. A beam stop-embodied terminating element 55 must be constructed of a material that will absorb laser light. Such materials are well known. O-ring 62 may be constructed of any pliant material, for example rubber.

Figure 7:
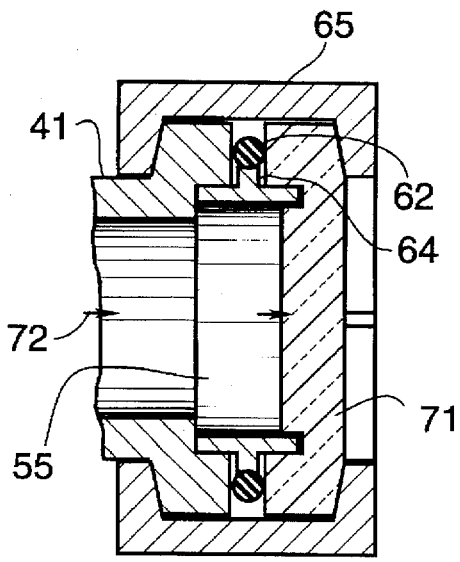
FIG. 7 depicts the terminal housing portion having a laser alignment device installed within the terminal housing according to the present invention.

Turning now to FIG. 7, the same terminal housing 41 as depicted in FIG. 6 is shown, with terminating element 55 and solid backing 63 removed. In lieu of terminating element 55 and solid backing 63, a laser alignment device 71 is inserted. Device 71 is secured with the same o-ring 62, centering ring 64, and clamp 65 used to secure terminating element 55 during normal operation of the semiconductor process tool. Device 71 is manufactured with outer dimension equal to the outer dimension of terminating element 55. Device 71 is fabricated of a material which will respond to laser light. For example, frosted plastic might be used and the observed response is a point of light or "visual indicia" at the point where the laser light impinges upon device 71. In another embodiment, glass is used instead of plastic as the construction material for laser alignment device 71. In the glass embodiment, the observed response is again visual indicia at the point where the laser light impinges upon device 71.

As shown in FIG. 7, laser light 72 extends into and through laser alignment device 71, and can then be observed as visual indicia upon laser alignment device 71. Thus, the current alignment or misalignment of the laser can be determined. More importantly, misalignment of the laser can be corrected, as described below.

Figure 8:
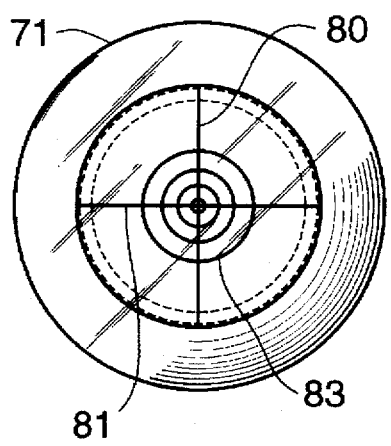
FIG. 8 is a front view of the laser alignment device with alignment marks formed upon or within the device.

As shown in FIG. 8, alignment marks are formed upon aligned device 71. According to one embodiment, alignment marks comprise orthogonal lines 80 and 81 formed within or upon device 71 such that they intersect. The point of intersection of orthogonal lines 80 and 81 may be at any point within or upon device 71. Preferably, the point of intersection is at the center of device 71. According to another embodiment, alignment marks comprise concentric circles 83 arranged in "bulls eye" fashion. Numerous other alignment mark configurations can also be used in lieu of or in addition to the orthogonal lines or concentric circle pattern. Regardless of the alignment mark configuration, a centering pattern is depicted for allowing repositioning of the laser beam impingement point on, for example, the center of the pattern.

With device 71 secured, laser 40 can be powered on and the current alignment of the laser determined by observing the response of device 71. In one embodiment, the response of device 71 is a visual response, in the form of visual indicia at the point of impingement of laser beam 72 upon laser alignment device 71. It is understood that other embodiments may provide non-visual responses. An exemplary form of non-visual response would be an audible response. If no response is observed from laser alignment device 71, then laser beam 72 does not impinge anywhere upon device 71. If there is no observed response, or the observed response is not at the point of intersection of orthogonal lines 80 and 81, then laser 40 is in need of alignment. Since laser 40 is movably secured, it can be powered on and moved such that the emitted laser light is redirected. This movement is performed directly or indirectly by loosening the coupling 48. The aforementioned movement and observation are repeatedly performed until the laser light impinges device 71 at the point of the alignment marks, for example, at the intersection of orthogonal lines 80 and 81. Thereafter, laser 40 is powered off and device 71 is removed and replaced with terminating element 55. Laser 40, when powered on again, will impinge upon terminating element 55 at the intended point of impingement. The intended point of impingement is defined as the point on the inner surface of beam stop 55 corresponding to the desired point upon the alignment mark. In one embodiment, the intended point of impingement is at the center of laser alignment device 71 and, therefore, at the center of the inner surface of beam stop 55.

Figure 9:
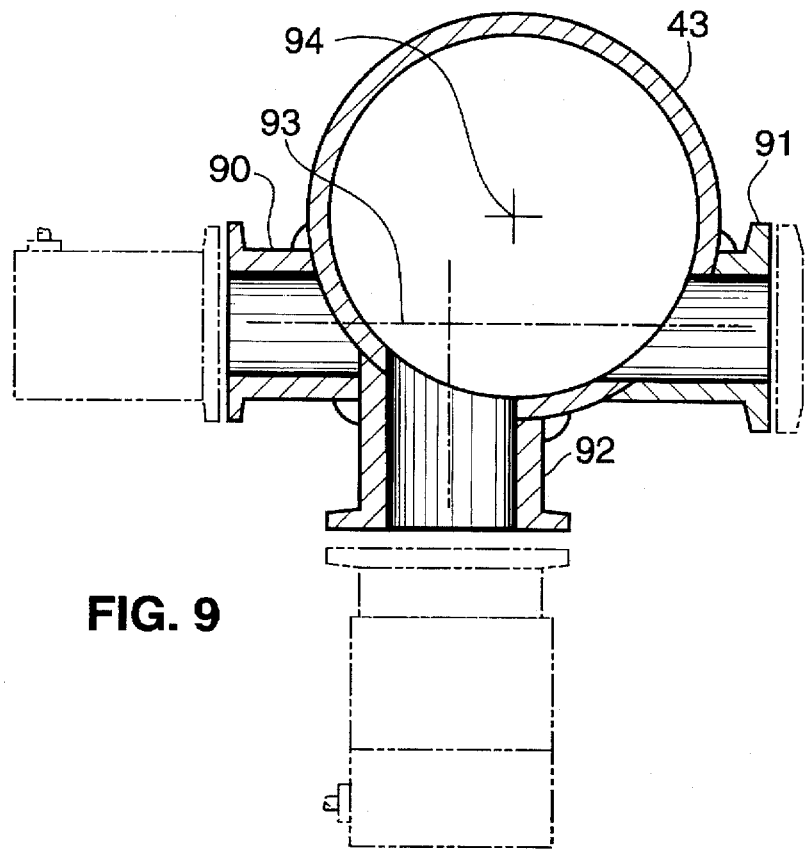
FIG. 9 is the non-intrusive measurement device coupled in an offset position according to an alternative embodiment of the present invention.

Although FIGS. 4 through 8 have depicted the apertures for laser 40, photodiode housing 42, and terminal housing 41 to be such that the laser light passes through the center of the exhaust port, this is in fact not critical to the measurement system nor to the use of laser alignment device 71. Instead, the apertures can be configured off-center as shown in FIG. 9, where laser aperture 90, terminating element aperture 91, and photodiode aperture 92 are configured such that the particles are measured flowing through an area not centered in the exhaust tube 43. The center of exhaust tube 43 is indicated by numeral 94.

Numerous variations and modifications will become apparent to those skilled in the art once the above disclosure is fully appreciated. It is intended that the following claims be interpreted to embrace all such variations and modifications.

What is claimed is:

1. A laser alignment device for use in a particle measurement device comprising a rigid member which, when impinged upon by a laser beam visually illuminates at the location of impingement, and wherein said surface includes on alignment mark thereon for aligning a laser beam to a beam stop dimensioned to replace said laser alignment device after alignment of said alignment mark is concluded.

2. The laser alignment device as recited in claim 1, wherein said alignment mark comprises a pair of orthogonal lines are formed upon at least one surface of the member.

3. The laser alignment device as recited in claim 2, wherein said orthogonal lines are formed by scribing.

4. The laser alignment device as recited in claim 1, wherein said alignment mark comprises a pair of orthogonal lines which intersect at the center of said rigid member.

5. The laser alignment device as recited in claim 1, further comprising a laser adapted for movement such that the laser beam emanating from said laser is directed upon said alignment mark by movement of said laser.

6. The laser alignment device as recited in claim 1, wherein said rigid member is translucent.

7. The laser alignment device as recited in claim 1, wherein said rigid member is formed from plastic.

8. The laser alignment device as recited in claim 7, wherein said plastic is frosted.

9. The laser alignment device as recited in claim 1, wherein said rigid member is formed from glass.

10. The laser alignment device as recited in claim 9, wherein said glass is frosted.

11. The laser alignment device as recited in claim 1, wherein said rigid member is coated on at least one surface of said member with a coating which visually responds at the point of impingement to a laser beam having a wavelength outside the visual spectrum.

12. A mechanism for aligning a laser movably secured to a semiconductor process tool, comprising:

a semiconductor process tool having first and second apertures extending into a chamber;

a translucent member sealingly covering each said first and second aperture;

a laser movably coupled onto the outside of said chamber in alignment over the translucent member-covered first aperture;

a laser alignment device configured to receive light emitted from the movably coupled laser, is coupled onto the outside of said chamber in alignment over the translucent member-covered second aperture; and a power source coupled to said laser for generating, during use, a laser beam extending completely through said chamber from said laser to said laser alignment device.

13. The mechanism as recited in claim 12, wherein said laser includes a coupling mounted between said chamber and said laser for moving said laser in accordance with placement of the laser beam upon the laser alignment device.

14. The mechanism as recited in claim 12, wherein said laser alignment device is geometrically configured to couple onto said chamber in lieu of a terminating element.

15. The mechanism as recited in claim 12, wherein said laser alignment device comprises an intersecting pair of orthogonal lines formed thereon.

16. The mechanism as recited in claim 13, wherein said coupling is responsive to movement necessary to align the laser beam emanating from said laser upon an intersection of an intersecting pair of orthogonal lines formed upon the laser alignment device.

17. The mechanism as recited in claim 13, wherein said coupling is responsive to movement necessary to align the laser beam emanating from said laser upon a plurality of concentric circles formed upon the laser alignment device.

18. The mechanism as recited in claim 17, wherein said fabrication chamber further comprises a photodiode mounted upon said chamber and aligned to receive light scattered by said particles as the particles pass through said laser beam.

19. A method for aligning a laser coupled within a particle detector device of a semiconductor process tool, comprising:

providing a semiconductor process tool having a translucent member sealingly coupled over a pair of spaced apertures extending into a chamber;

movably connecting a laser over one of said pair of member-covered apertures and connecting a terminal housing over the other of said pair of member-covered apertures; covered apertures;

connecting a laser alignment device within said terminal housing, said laser alignment device having an alignment mark formed thereon configured to receive light generated by the laser;

moving said laser to align a laser beam extending from said laser such that said laser beam impinges upon the laser alignment device at the position at which the alignment mark is formed; and replacing said laser alignment device with a terminating element having an outer circumference equivalent to said laser alignment device.

20. The method as recited in claim 19, further comprising providing power to said laser prior to said moving step and removing power from said laser prior to said replacing step.

21. The method as recited in claim 19, further comprising arranging a path of particles through said chamber, wherein said particles arise during semiconductor wafer fabrication, and wherein said path of particles are arranged to traverse said laser beam.

22. The method as recited in claim 19, wherein said replacing step comprises removing said laser alignment device from said terminal housing and thereafter coupling said terminating element in the space vacated by said laser alignment device.

23. A method for aligning a laser coupled within a particle detector device of a semiconductor process tool, comprising:

providing a semiconductor process tool having a translucent member sealingly coupled over a pair of spaced apertures extending into said chamber;

movably connecting a laser over one of said pair of member-covered apertures and connecting a terminal housing over the other of said pair of member-covered apertures;

connecting a laser alignment device within said terminal housing, said laser alignment device having an alignment mark formed thereon;

moving said laser to align a laser beam extending from said laser such that said laser beam impinges upon the laser alignment device at the position at which the alignment mark is formed;

replacing said laser alignment device with a terminating element having an outer circumference equivalent to said laser alignment device; and arranging a path of particles through said chamber, wherein said particles arise during semiconductor wafer fabrication, and wherein said path of particles are arranged to traverse said laser beam.

* * * * *

UNITED STATES PATENT AND TRADEMARK OFFICE
CERTIFICATE OF CORRECTION

PATENT NO. : 5,686,996
DATED : November 11, 1997
INVENTOR(S) : James K. Fidler, et al.

It is certified that error appears in the above-identified patent and that said Letters Patent is hereby corrected as shown below:

On the title page, item [75]:

Please add --Valentin Parks; Austin, TX-- as an inventor.

Signed and Sealed this

First Day of December, 1998

Attest:

BRUCE LEHMAN

Attesting Officer

Commissioner of Patents and Trademarks